C. H. LIGHT.
TROLLEY.
APPLICATION FILED MAY 26, 1913.
1,096,379.
Patented May 12, 1914.
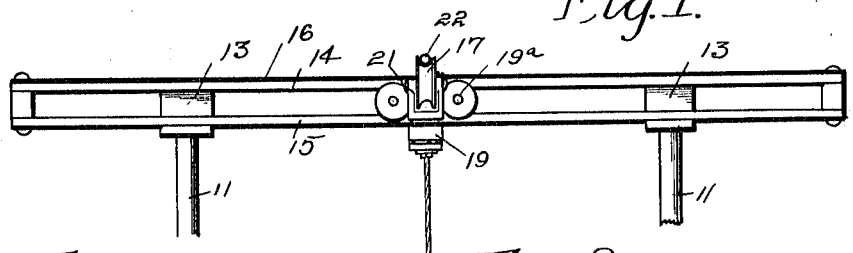
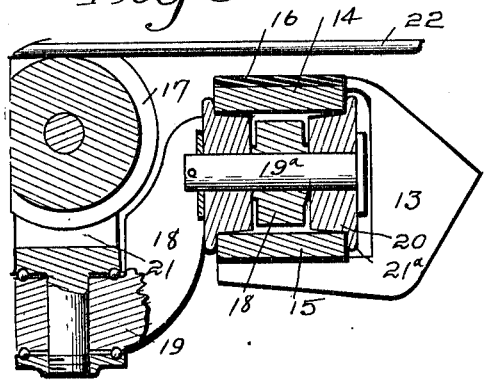
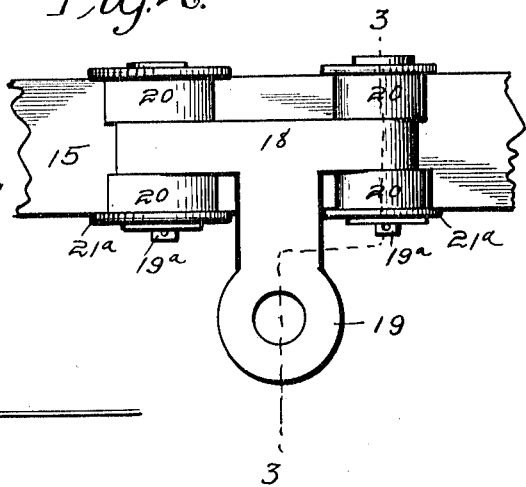
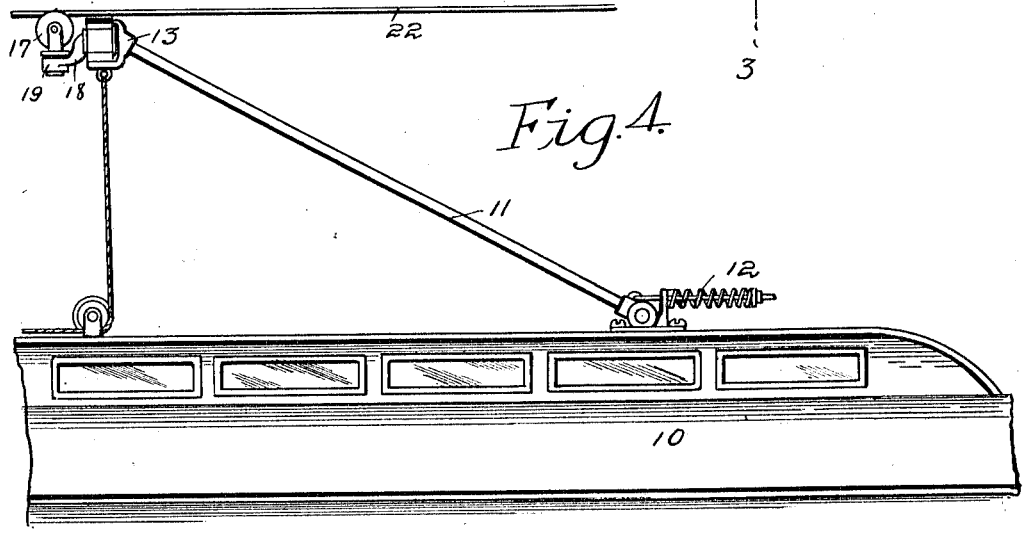
Witnesses
A. G. Hague.
Will Freeman.
Inventor
Claus H. Light
by Orwig & Bair attys

UNITED STATES PATENT OFFICE.

CLAUS H. LIGHT, OF DES MOINES, IOWA, ASSIGNOR OF ONE-HALF TO A. L. IRWIN, OF DES MOINES, IOWA.

TROLLEY.

1,096,379.  Specification of Letters Patent.  Patented May 12, 1914.

Application filed May 26, 1913. Serial No. 770,059.

*To all whom it may concern:*

Be it known that I, CLAUS H. LIGHT, a citizen of the United States, and resident of Des Moines, in the county of Polk and State of Iowa, have invented a certain new and useful Trolley, of which the following is a specification.

The object of my invention is to provide a trolley of simple and durable construction, so constructed and arranged as to prevent the trolley wheel from leaving the current carrying wire.

More particularly it is my object to provide a trolley pole made in two parts mounted on the car in such manner as to prevent lateral movement of the pole and provided at its upper end with a laterally movable carriage on which the trolley wheel is pivotally mounted.

Still a further object is to provide such a pole, mounted near the center of the car, so that the lateral movement of the pole with relation to the track is minimized.

My invention consists in certain details, in the construction, combination and arrangement of the various parts of the device whereby the objects contemplated are attained, as hereinafter more fully set forth, pointed out in my claim and illustrated in the accompanying drawings, in which—

Figure 1 shows a rear view of a portion of a trolley, embodying my invention. Fig. 2 shows a top or plan view of a part of the same, the upper track for the carriage and the trolley wheel being removed. Fig. 3 shows a detail, sectional view, taken on the line 3—3 of Fig. 2, and Fig. 4 shows a side elevation of the top of a car equipped with a trolley, embodying my invention.

In the accompanying drawing I have used the reference numeral 10 to indicate generally the portion of a car shown. Pivoted to the top of the car, at a point spaced apart from the middle thereof, from end to end, are parallel poles 11, extending upwardly and rearwardly, said poles being capable of pivotal movement in a vertical plane, but being fixed against lateral movement with relation to the car. For yieldingly holding the poles 11 at the upward limit of their movement, I have provided a spring 12. Secured to the upper ends of the poles 11 are brackets 13, mounted on which are parallel tracks 14 and 15, located in horizontal planes, one above the other. On the upper surface of the upper track 14 is a strip 16 of insulation.

For supporting a trolley wheel 17 I have provided a carriage which is constructed as follows: I provide a bracket 18, rotatably mounted in which are two shafts 19ª. Upon each end of each shaft 19ª is a wheel 20 having at its outside a circumferential annular flange 21ª designed to engage the tracks 14 and 15.

By the construction just described, I have provided a carriage which travels readily between the tracks 14 and 15. The bracket 18 is provided with a downwardly and rearwardly extending arm 19. Pivoted or swiveled to the arm 19 is a bracket 21 in which is rotatably mounted an ordinary grooved trolley wheel 17, which engages the wire 22. The poles 11 are so mounted that the upper ends of said poles are substantially over the center of the car.

In the practical operation of my improved trolley the poles 11 are held rigid against lateral movement. When, however, the car turns a corner, the wheel 17 with the carriage hereinbefore described is permitted to slide on the tracks 14 and 15.

It is well known that ordinarily a trolley pole is mounted on the car near one end thereof and that when the car turns a corner, even the lower end of the pole swings away from the vertical plane intersecting the middle of the track on which the car travels. On account of this fact the pole is swung laterally from the car and the trolley wheel frequently leaves the wire. By mounting the trolley poles on the car, as hereinbefore described, in such manner that the upper ends thereof are above the middle of the car, the upper end of the pole does not move laterally with relation to the vertical plane which bisects the horizontal plane in which the track lies, midway between the rails so far as is the case with the ordinary method of trolley poles. On account of the arrangement just mentioned, I am enabled to do away with a large part of the tendency of the trolley wheel to jump the wire. On account of the provision of the double tracks 15 and 14 and the carriage 10 readily slidable thereon, sufficient lateral movement is permitted to the trolley wheel to allow the wheel to travel on the wire at all times. The arrangement of the tracks 14 and 15 and the carriage thereon and the construction and mounting of the trolley wheel 17 permit the trolley wheel to travel almost in the same vertical plane in which the wire 22 lies. When the trolley wheel can travel in said plane, it is not likely to leave the wire. The construction of my device, therefore, does away with one of the great sources of inconvenience in operating electric cars. By placing the insulation strip 16 on the top of the track 14 I prevent interference with the cross wires should the trolley wheel leave the wire at any time. It will be seen that on account of the length of the tracks 14 and 15, if the trolley wheel should leave the wire, the insulated strip 16 on the track 14 would engage the wire. In this connection it should be noted that the track 14 is above the level of the middle of the trolley wheel 17 so that should the trolley wheel leave the wire, the track 14 will slide along the wire and on account of the way in which the guy wires are secured to the current carrying wire would not touch said guy wires. On account of the fact that the trolley wheel is so low compared to the track 14, the trolley wheel will engage the guy wires at points on the trolley wheel above the middle thereof and will not tear down the wire as would be the case where the trolley pole can spring up and catch the cross or guy wires. On account of the strip of insulation, if the trolley wheel should leave the wire, the car is immediately insulated from the wire which engages said strip.

It will be understood that changes may be made in the details of the construction of my improved trolley and it is my intention to cover by this application any such changes which may be included within the scope of the following claim.

I claim as my invention:

In a device of the class described, a trolley pole, parallel transverse guide tracks, arranged one above the other, mounted on the upper end thereof, a bracket mounted to slide between said tracks, said bracket having a downwardly and rearwardly extending arm, a trolley wheel rotatably mounted in said arm, so arranged that its transverse median line is below the level of the upper track.

Des Moines, Iowa, May 20, 1913.

CLAUS H. LIGHT.

Witnesses:
S. ROBINSON,
M. WALLACE.

---

Copies of this patent may be obtained for five cents each, by addressing the "Commissioner of Patents, Washington, D. C."